US008504878B2

(12) United States Patent
Otenko (10) Patent No.: US 8,504,878 B2
(45) Date of Patent: Aug. 6, 2013

(54) STATISTICAL ANALYSIS OF HEAP DYNAMICS FOR MEMORY LEAK INVESTIGATIONS

(75) Inventor: Oleksandr Otenko, Wokingham (GB)

(73) Assignee: Oracle International Corporation, Redwood Shores, CA (US)

( * ) Notice: Subject to any disclaimer, the term of this patent is extended or adjusted under 35 U.S.C. 154(b) by 449 days.

(21) Appl. No.: 12/773,203

(22) Filed: May 4, 2010

(65) Prior Publication Data

US 2011/0276833 A1 Nov. 10, 2011

(51) Int. Cl.
*G06F 11/00* (2006.01)

(52) U.S. Cl.
USPC .............. 714/42; 717/128; 717/131; 711/170

(58) Field of Classification Search
USPC .................. 714/42; 717/128, 131; 711/170
See application file for complete search history.

(56) References Cited

U.S. PATENT DOCUMENTS

| | | | | |
|---|---|---|---|---|
| 6,393,439 | B1 * | 5/2002 | Houldsworth et al. ................ | 1/1 |
| 6,401,182 | B1 * | 6/2002 | Sweeney ........................ | 711/171 |
| 6,804,691 | B2 * | 10/2004 | Coha et al. ............................ | 1/1 |
| 7,237,085 | B2 * | 6/2007 | Sexton et al. .................. | 711/221 |
| 7,389,395 | B1 * | 6/2008 | Garthwaite et al. .......... | 711/165 |
| 7,478,156 | B1 * | 1/2009 | Pereira ........................... | 709/224 |
| 7,509,338 | B1 * | 3/2009 | Tarditi .................................. | 1/1 |
| 7,950,004 | B2 * | 5/2011 | Vieira et al. .................... | 717/125 |
| 8,229,726 | B1 * | 7/2012 | Magdon-Ismail et al. ...... | 703/20 |
| 2004/0133759 | A1 * | 7/2004 | Sekiguchi ..................... | 711/170 |
| 2004/0193828 | A1 * | 9/2004 | Nevill ............................. | 711/170 |
| 2005/0033781 | A1 * | 2/2005 | Dussud .......................... | 707/206 |
| 2006/0265438 | A1 * | 11/2006 | Shankar et al. ............... | 707/206 |
| 2009/0327373 | A1 * | 12/2009 | Chacko et al. ................ | 707/206 |
| 2009/0328007 | A1 * | 12/2009 | Chen et al. .................... | 717/128 |
| 2010/0192133 | A1 * | 7/2010 | Brady ............................ | 717/128 |
| 2010/0205230 | A1 * | 8/2010 | Simeonov et al. ............ | 707/813 |
| 2010/0205674 | A1 * | 8/2010 | Zorn et al. ....................... | 726/25 |
| 2010/0211754 | A1 * | 8/2010 | Crosby et al. ................. | 711/170 |
| 2010/0229159 | A1 * | 9/2010 | Odaira et al. ................. | 717/128 |
| 2010/0287538 | A1 * | 11/2010 | Soundararajan et al. ..... | 717/128 |
| 2011/0029822 | A1 * | 2/2011 | Moser ............................. | 714/45 |
| 2011/0107877 | A2 * | 5/2011 | Seal ................................ | 75/711 |
| 2011/0276949 | A1 | 11/2011 | Otenko | |

\* cited by examiner

*Primary Examiner* — Loan L. T. Truong
(74) *Attorney, Agent, or Firm* — Kilpatrick Townsend & Stockton LLP (57) ABSTRACT

Embodiments of the invention provide systems and methods for analyzing memory heap information for investigation into a memory leak caused by an application. According to one embodiment, a method of analyzing heap data can comprise obtaining the heap data from a memory. The heap data can represent a plurality of objects of one or more classes, each object identifying a referrer instance, a field in the referrer, and a referent instance. A statistical analysis can be performed on the heap data to identify objects within the heap that are contributing to a growth of the heap. The heap can be traversed based on the referrer instance of one or more objects identified as contributing to the growth of the heap to a root object identified as not contributing to the growth of the heap.

12 Claims, 5 Drawing Sheets

STATISTICAL ANALYSIS OF HEAP DYNAMICS FOR MEMORY LEAK INVESTIGATIONS

CROSS-REFERENCES TO RELATED APPLICATIONS

The present application is related to U.S. patent application Ser. No. 12/773,211 entitled "Memory Leak Detection" which is filed concurrently herewith and incorporated herein by reference for all purposes.

BACKGROUND OF THE INVENTION

Embodiments of the present invention relate generally to methods and systems for debugging or troubleshooting a computer program and more particularly to analyzing memory heap information for investigation into a memory leak caused by an application.

Memory leaks are a common problem that occurs because of errors in software code. It can be described as a problem of the software program being unable to reuse the memory that it does not need anymore. A typical case is that the software error prevents the memory the program has previously obtained from the memory manager and does not need anymore, from being returned to the memory manager. For example, an application may allocate memory for a particular object, data structure, etc. but then, due to an error, fail to deallocate this memory. Over time, with many iterations of the application, such errors can create a growth in the size of a memory heap used by the application and, correspondingly, a decrease in the memory available for use by the application.

In order to identify and correct these errors, a memory leak analysis can be performed on an application, for example during debugging or troubleshooting of the application. Existing tools for performing memory leak analysis, so called memory profilers, allow for monitoring of the memory to help find the objects that grow, and locate the referrers of those objects. Then, determining the failing code path related to these objects is done manually. Typically, the memory profile collects a heap dump, i.e., takes a snapshot of the memory used by an application at a particular instant in time. Several memory profiler software tools exist on the market which simplify the task by analyzing a heap dump where it is possible to inspect the references between the objects that existed in memory at the time of collection of the heap dump. Certain algorithms exist for automating such a heap analysis. For example, some tools can compare two heap dumps to find the differences, which can then be attributed to memory leaks. The investigation of the memory leak would then normally start with the area of memory that can be seen accumulating the most objects.

The drawbacks of either of this analysis stem from an inability to monitor the heap at run time, so that only one or two heap dumps corresponding to two points in the program's life, can be analyzed. This often provides false positives— some areas are determined to be growing, whereas the growth can be proven to be transient. With the size of memory being in hundreds of megabytes and the program constantly allocating and deallocating memory during its operation, this becomes a very difficult task for a human, especially when monitoring live running programs. Additionally, the memory leak is rarely caused by a single software problem; there usually is a superposition of problems that cause the memory leak to occur. This complicates manual analysis even further.

Hence, there is a need for improved methods and systems for detecting an analyzing memory leaks.

BRIEF SUMMARY OF THE INVENTION

Embodiments of the invention provide systems and methods for analyzing memory heap information for investigation into a memory leak caused by an application. According to one embodiment, a method of analyzing heap data can comprise obtaining the heap data from a memory. The heap data can represent a plurality of objects of one or more classes, each object identifying a referrer instance, a field in the referrer, and a referent instance. Obtaining the heap data can comprise collecting three or more heap dumps dynamically during execution of an application creating the instances.

A statistical analysis can be performed on the heap data to identify references to objects within the heap that are contributing to a growth of the heap. Performing the statistical analysis on the heap data can comprise grouping the plurality of references to objects into a plurality of subgroups based on the identified referrer instance, field in the referrer, and referent instance of each reference, determining a size of each subset, determining a relative rank of each subset, wherein the relative rank of each subset is based on the size of each subset and a total heap size, and identifying at least one subset of references to objects contributing to the growth of the heap based on the relative rank of each subset. A correlation coefficient can be calculated for each subset based on the size of each subset, and used as the relative rank of each subset.

The heap can be traversed based on the referrer instance of one or more objects identified as contributing to the growth of the heap to a root object identified as not contributing to the growth of the heap. For example, the correlation coefficient of each subset can have a value between −1.0 and +1.0. In such cases, identifying at least one subset contributing to the growth of the memory heap can comprise identifying a subset of references having a correlation coefficient of approximately +1.0, and referenced by a subset of root objects, which are the referrers of those references.

According to another embodiment, a system can comprise a processor and a memory communicatively coupled with and readable by the processor. The memory can have stored therein a series of instructions which, when executed by the processor, cause the processor to analyze heap data by obtaining the heap data from a memory, the heap data representing a plurality of objects of one or more classes and a plurality of links between the objects, each link identifying a referrer instance, a field in the referrer, and a referent instance. Obtaining the heap data can comprise collecting three or more heap dumps dynamically during execution of an application creating the instances.

A statistical analysis can be performed on the heap data to identify references to objects within the heap that are contributing to a growth of the heap. Performing the statistical analysis on the heap data can comprise grouping the plurality of references to objects into a plurality of subgroups based on the identified referrer instance, field in the referrer, and referent instance of each object, determining a size of each subset, determining a size of each subset relative to a total heap size, and identifying at least one subset of references to objects contributing to the growth of the heap based on the size of each subset relative to the total heap size. A correlation coefficient can be calculated for each subset based on the size of each subset relative to the total heap size.

The heap can be traversed based on the referrer instance of one or more objects identified as contributing to the growth of the heap to a root object identified as not contributing to the growth of the heap. For example, the correlation coefficient of each subset can have a value between −1.0 and +1.0. In such cases, identifying at least one subset contributing to the growth of the memory heap can comprise identifying a subset having a correlation coefficient of approximately +1.0.

According to yet another embodiment, a machine-readable medium can have stored thereon a series of instructions which, when executed by a processor, cause the processor to analyze heap data by obtaining the heap data from a memory. The heap data can represent a plurality of objects of one or more classes, each object identifying a referrer instance, a field in the referrer, and a referent instance. For example, obtaining the heap data can comprise collecting three or more heap dumps dynamically during execution of an application creating the instances. A statistical analysis can be performed on the heap data to identify references to objects within the heap that are contributing to a growth of the heap. Performing the statistical analysis on the heap data can comprise grouping the plurality of references to objects into a plurality of subgroups based on the identified referrer instance, field in the referrer, and referent instance of each reference, determining a size of each subset, determining a size of each subset relative to a total heap size, and identifying at least one subset of objects contributing to the growth of the heap based on the size of each subset relative to the total heap size. A correlation coefficient can be calculated for each subset based on the size of each subset relative to the total heap size. The heap can be traversed based on the referrer instance of one or more objects identified as contributing to the growth of the heap to a root object identified as not contributing to the growth of the heap. For example, the correlation coefficient of each subset can have a value between −1.0 and +1.0. In such cases, identifying at least one subset contributing to the growth of the memory heap can comprise identifying a subset having a correlation coefficient of approximately +1.0.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/ or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for analyzing memory heap information for investigation into a memory leak caused by an application. More specifically, embodiments of the present invention provide for statistical analysis of heap dynamics in order to determine the causes of a memory leak. Embodiments of the present invention can be applied to any software program or apparatus where memory state can be described by a set of attributes at several points in time. In one embodiment, information related to objects of a memory heap can be collected. For example, one or more series of so called class histograms such as produced by the Java Virtual Machine can be collected upon request. These class histograms can consist of a list of the names of the classes loaded by Java Virtual Machine or other environment, counts of instances of objects of each such class, cumulative memory size taken by these objects, and the total memory taken by all the objects that have not been deallocated yet. Based on the class histograms or other representations of heap data, a determination can be made as to whether the heap is growing in a manner as to suggest a memory leak. For example, this determination can be made according to the methods and systems described in the Related Application entitled "Memory Leak Detection" cited above and incorporated herein by reference.

Once a memory leak is detected or suspected, based on this or other methods, the heap data can be analyzed to locate code contributing to or causing growth in the heap. Generally speaking, a list of classes known to be growing can be used to perform a search for growth locations. The algorithm of this search uses a list of classes whose instances are considered growing, and finds the instances, i.e., "growth roots", from which such growing instances are referenced. The results of analysis of a series of heap dumps can be processed using statistical methods, which identify location of statistically significant growths. In one embodiment the heap analysis can be performed using multiple heap dumps of the same program. In another embodiment the heap analysis can be performed in real-time, for example on the live Java Virtual Machine, saving time and providing analysis results at the time the Memory Leak is detected.

Stated another way, embodiments of the invention provide systems and methods for analyzing memory heap information for investigation into a memory leak caused by an application. According to one embodiment, analyzing heap data can comprise obtaining the heap data from a memory. The heap data can represent a plurality of references to objects of one or more classes, each reference identifying a referrer instance, a field in the referrer, and a referent instance. A statistical analysis can be performed on the heap data to identify references to objects within the heap that are contributing to a growth of the heap. The heap can be traversed based on the referrer instance of one or more objects identified as contributing to the growth of the heap to a root object identified as not contributing to the growth of the heap. Various additional details of embodiments of the present invention will be described below with reference to the figures.

Figure 1:
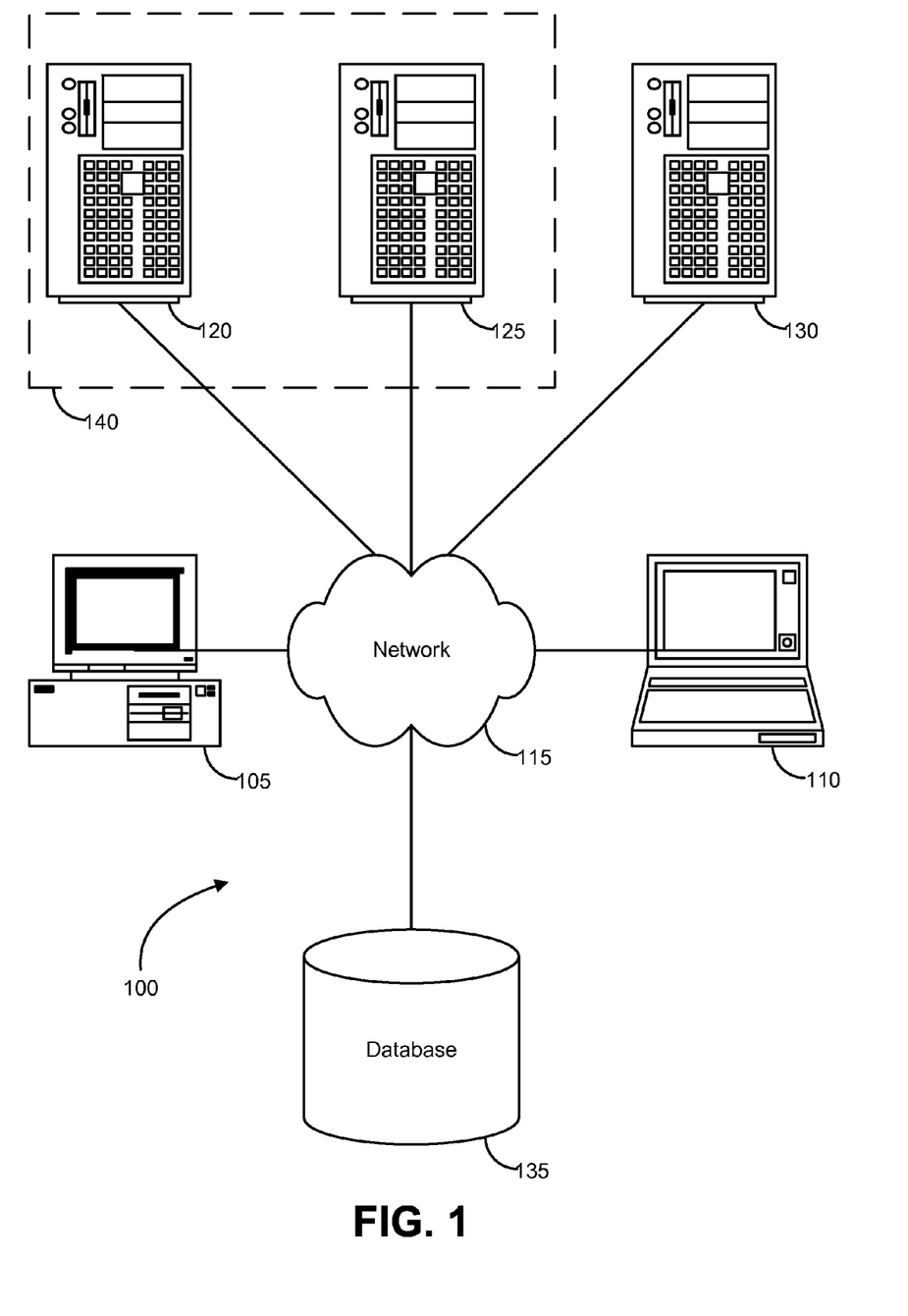
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
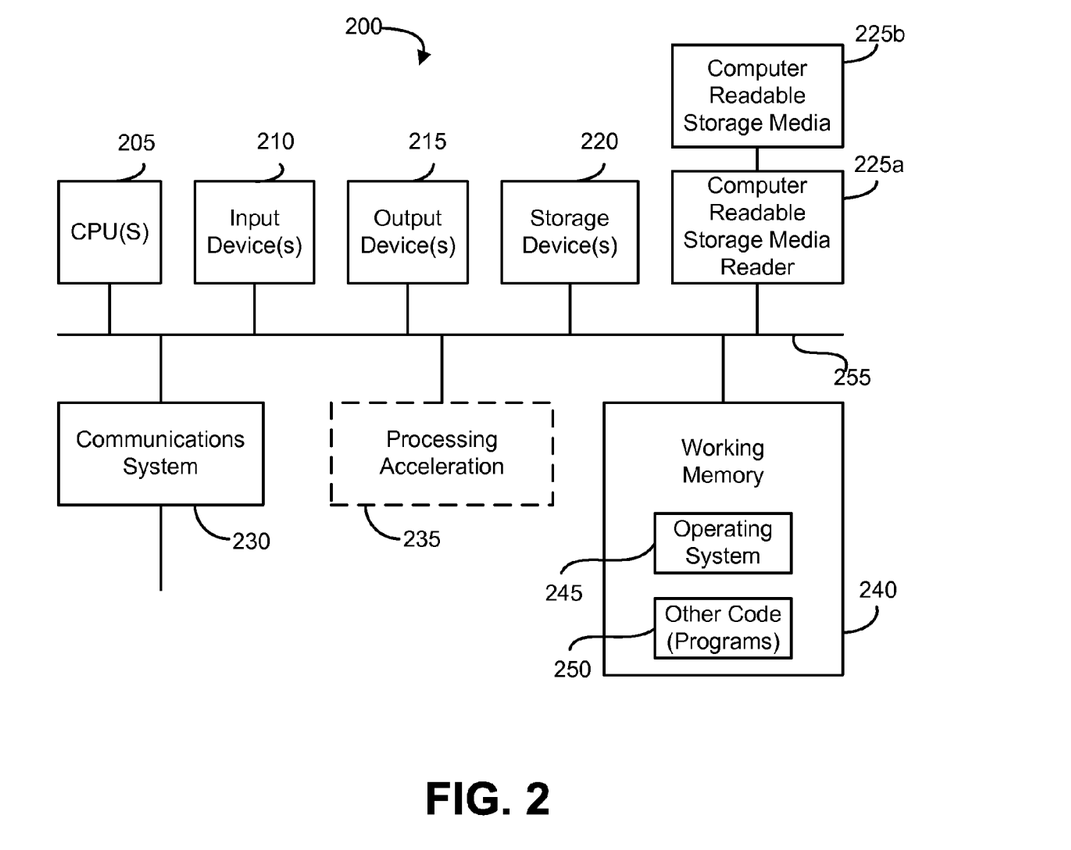
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

As noted above, embodiments of the present invention provide for statistical analysis of heap dynamics in order to determine the causes of a memory leak. That is, trend analysis can be used to detect a memory leak problem. Once detected, the heap data can be analyzed to locate code contributing to or causing growth in the heap. Generally speaking, a list of classes known to be growing can be used to perform a search for growth locations. The algorithm of this search uses a list of classes whose instances are considered growing, and finds the instances, i.e., "growth roots", from which such growing instances are referenced. The results of analysis of a series of heap dumps can be processed using statistical methods, which identify location of statistically significant growths.

Figure 3:
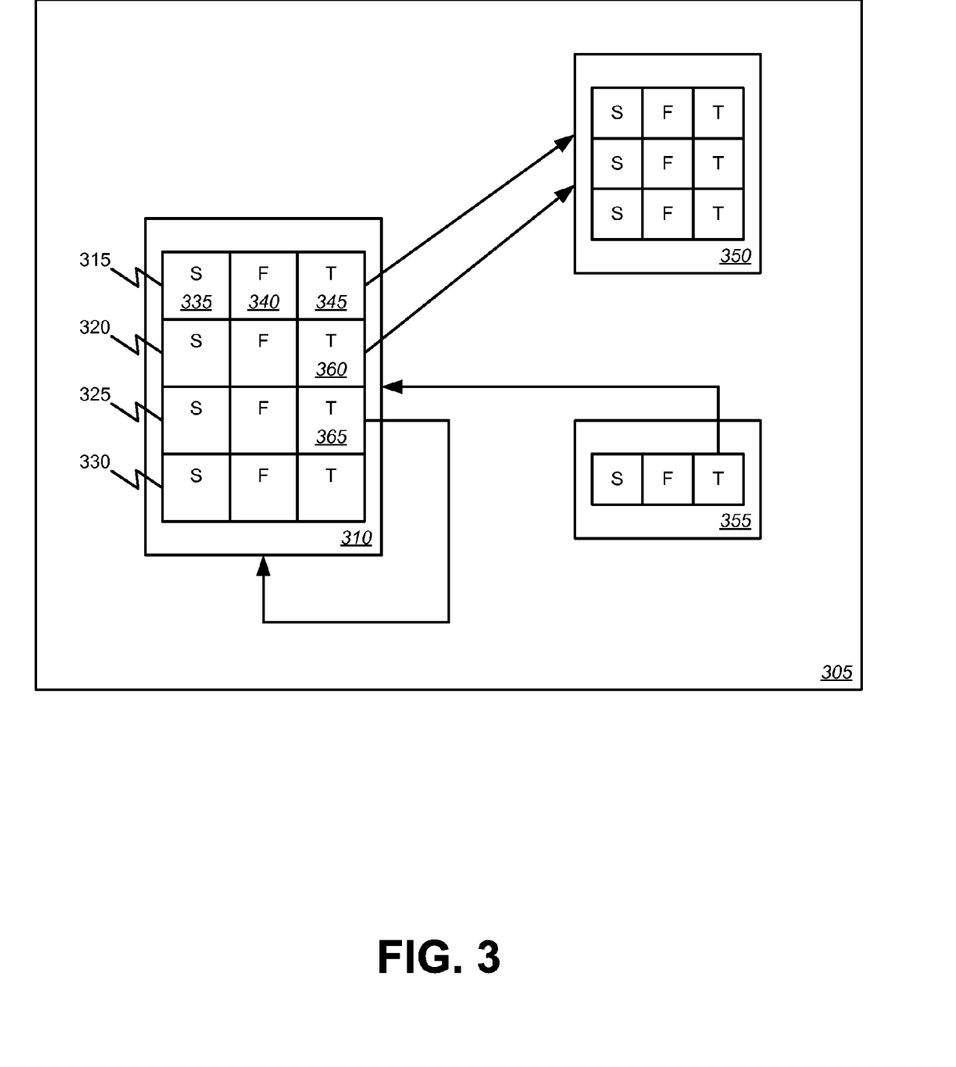
FIG. 3 is a block diagram illustrating a conceptual view of a memory heap according to one embodiment of the present invention.

FIG. 3 is a block diagram illustrating a conceptual view of a memory heap according to one embodiment of the present invention. In this example, the memory heap 305 can have stored therein a number of objects 310, 350, and 355. Each object 310, 350, and 355 can have one or more references 315-330 to none (like 330), one or more other instances, in some cases even referencing itself or having references to itself (like 325 and 355). It should be understood that, while illustrated here with relatively few objects 310, 350, and 355 and references 315-330 for the sake of simplicity and clarity, in actual implementations the memory heap 305 likely contains very large numbers of objects with any number of references to numerous other instances. Regardless of the number of Objects 310, 350, and 355 and instances 315-330, each instance 315-330 can include a representation 335 of a referrer instance (S), a representation 340 of the field in the referrer (F), and a representation 345 of a referent instance (T). Thus, according to one embodiment, the heap 305 can be modeled as a collection of links (SFT) which can be used to look for trends in changes in the links of similar types, i.e., pointing from instances of a same class S to an instance of same class T through a same field F in S. It should be understood that the representation 335 of the referrer instance (S) and the representation 340 of the field in the referrer (F) usually don't take space on the heap but are logical identifiers: the representation 335 of the referrer instance (S) can be the address of the vector of the representation 340 of the field in the referrer (F), and the representation 340 of the field in the referrer (F) can be a position of an element in that vector or the offset of the field within the object 310, counting from the representation 335 of the referrer instance (S). According to one embodiment, the representation 335 of the referrer instance (S) can be joined with the representation 340 of the field in the referrer (F) and each representation 345 of a referent instance (T) in the model of the heap to form a basis of the traversal or analysis algorithms explained further below.

In other words, let several memory heap instances ($H_i$) be available. Let each memory heap instance 315-330 be represented by a set of unique tuples $H_i = \{<S,F,T>\}$, where S is the referrer instance, F is the field in the referrer, and T is the referent instance. Each referent can be a referrer in some other tuple, and each referrer can be a referent in some other tuple. Some referrers are not referenced from any other tuple, and in this model they can be considered roots of the heap. Some roots of the heap have references to them. Without loss of generality, we do not model garbage instances (i.e., those that are not reachable from heap roots). Let each instance be assigned to a class, so that several instances of a single class may exist in some tuples in the heap. Let a set of classes considered growing, G, be available. Let a set of classes considered collections, C, be available. If S is an instance and G is a set of classes, the notation $S \in G$ can mean that an instance S belongs to a class that is in set G.

An instance in the heap can be considered a growth root if the count of instances of the same class does not change, but which references instances whose count increases. A conclusion from this definition can be that in order for the growth to occur the number of references (SFT tuples) grows without increasing the number of referrers (same S in some or all of those tuples). For example, in Java all instances have fixed size. So, statistically significant growth occurs when arrays are used to store the references, or an instance of a so-called collection class is used. There simply is no other way to increase the number of references without changing the number of referrers. The arrays also have fixed size, but new bigger ones can be allocated to copy the contents of the existing array, and the old array can then be garbage-collected. Thus, the instance count of arrays remains relatively static but the number of references that can be stored in the arrays can increase.

The instances of collection classes can form dynamically linked structures, like stacks, queues, lists, trees and others. In order to store more references than can already be stored in the collection instance, new collection instances can be created. The growth in the number of collection instances can be growing, if they reference instances that grow. Therefore, a distinction should be made of the growth of the collection instances purely to obtain more intuitive results quicker. Without this distinction, more heap instances may be needed to discount transient collection instance growths that naturally occur during the program's life without a cause for concern.

According to one embodiment, it is possible to find a set of growth roots $R_i=\{<S,F,T>\}$, $R_i \subset H_i$, when S and T satisfy a certain condition arising from the definition of the growth root. It is possible to perform correlational analysis of the sets of roots and the heap sizes to determine statistically significant growth roots and discard the roots referencing growths appearing transient. A set of growth roots $Z_{ki}$ where the growth is statistically significant can be identified. Tuples in the set of growth roots $R_i=\{<S,F,T>\}$ should satisfy the condition:

$$f(S,T)=S\not\subset G_\wedge (T\in G_\wedge (T\in C_\wedge \exists <T,F',T'>\in H_i \vee f(T,T'))),$$

which can be based on the definition of the growth root and understanding how the number of references is accumulated in the heap to form a memory leak, as laid out above. This form of the algorithm provides for finding such referrers that reference instances of the growing classes either directly, or through a chain of arrays and collection instances. At the same time, other references to objects referenced by the objects known to grow, can be ignored as consequential. Their growth can be explained by the growth in the number of referrers.

A variety of widely known search algorithms are considered to be applicable, including but not limited to graph edge search algorithms, where the directed graph consists of vertices corresponding to the objects on the heap, and the edges corresponding to the references linking the objects on the heap. In one embodiment, the search can consist of analysis of individual edges or references to find those satisfying the condition laid out above. A matching edge or reference can be found, when there is a path from a vertex corresponding to an object determined as not contributing to the heap growth to a vertex corresponding to an object determined as contributing to the heap growth, and where the path consists of only one edge, or contains only vertices corresponding to the objects determined to be collection objects, except the starting and finishing vertex, which are not collection objects. The matching edge in this embodiment of the search algorithm is considered the first edge of the path, and the starting vertex of the path is considered the growth root. Other search algorithms can be applied to find the references satisfying the above-mentioned condition describing the growth root.

It should be understood that the analysis of a single heap instance is likely to be insufficient to determine the growth root. This is because often there are many references from objects that are determined as not contributing to the growth, to the objects determined as contributing to the growth, but the change of the number of such references does not follow the trend of the heap size growth. If the change of the number of references does not follow the trend of the heap size growth, the objects being referred can be determined as not contributing to the growth, and the growth should be referenced from some other objects. Thus, according to one embodiment, a series of heap instances or heap dumps may be analyzed in order to find the references to the objects contributing to the growth.

As an illustration, consider two classes whose objects are determined as not contributing to the heap size growth, S and S', and one class whose objects are determined as contributing to the heap size growth, T. Then S is one of the growth roots, if the trend of creation of references from S to T by the application follows the trend of creation of objects of class T, hence in its turn contribute to the growth of the heap size. On the contrary, S' is not a growth root, if the application creates and destroys the references from S' to T in such a manner that the objects referenced from S' do not contribute to the heap size growth. For example, the number of references remain completely static, or the increase and decrease can be seen balanced over time, or the trend of creation of such references can be seen not following the trend of creation of objects of class T, and hence not contributing to the growth of the heap. Therefore, it is sufficient to compare the trend of the changes of the reference counts and the trend of the heap size change in several heap instances, in order to determine the objects of which class can be considered roots of the growth. In one embodiment, analysis can include collecting three or more heap instances, or heap dumps, and performing the statistical analysis of the trends of the numbers of references versus the trend of the heap size.

Figure 4:
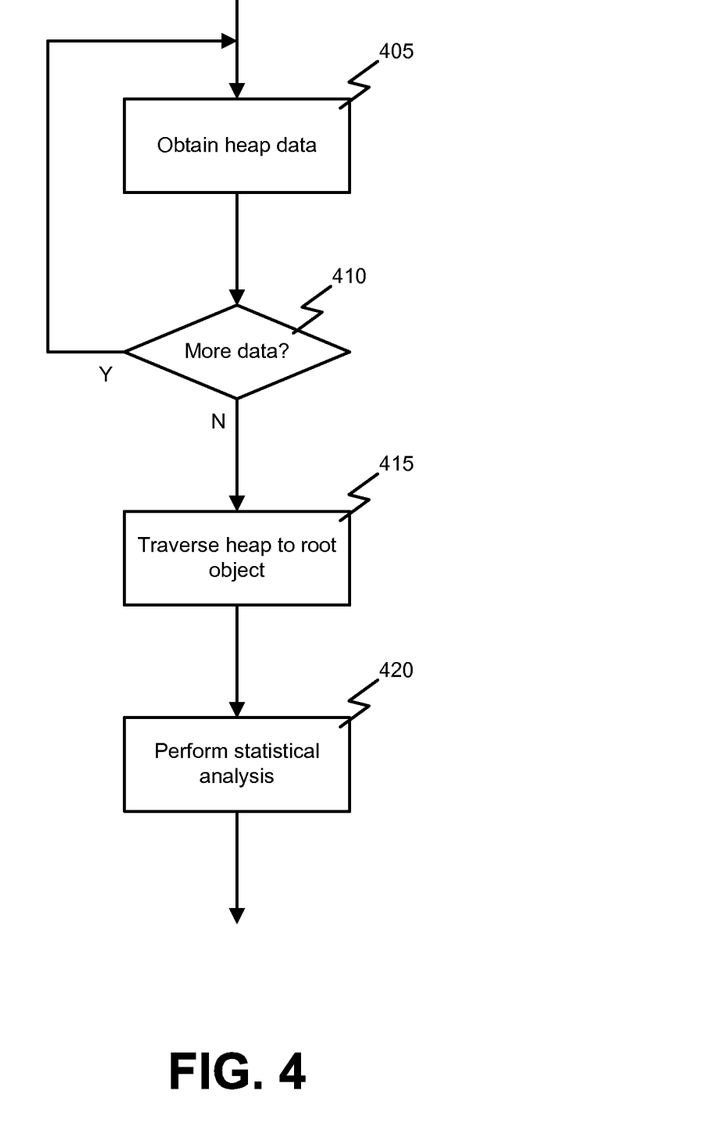
FIG. 4 is a flowchart illustrating a process for heap analysis according to one embodiment of the present invention.

FIG. 4 is a flowchart illustrating a process for heap analysis according to one embodiment of the present invention. In this example, the process begins with obtaining 405 the heap data from a memory, e.g., as a heap dump. The heap data can represent a plurality of objects of one or more classes, each object identifying a referrer instance, a field in the referrer, and a referent instance. Obtaining 405 the heap data can also comprise collecting class histograms. For example, the class histograms can comprise a list of names of the classes of the plurality of objects, counts of objects of each class, cumulative memory size used by each of the objects, and total memory used. In some cases, obtaining 405 the heap data can comprise collecting multiple heap instances (commonly referred to as heap dumps) and three or more class histograms for each instance dynamically during execution of an application creating the instances. The timing of collecting the plurality of the heap data can be chosen to best represent the process being performed by the application. For example, in some cases it is possible to synchronize the collection of the heap data with the end of a certain operation, in which case the plurality of the heap data will be representative of multiple executions of that operation. In other examples the heap data can be collected at some uniform time intervals to be representative of a uniform load the application experiences. In other examples the timing of the heap data collection can be chosen differently for the samples to be representative of the process being performed by the application. Thus, a determination 410 can be made as to whether additional heap data can or should be collected and, in response to determining 410 that additional data should be collected, additional class histograms and/or heap dumps can be collected 405 to provide a series, e.g., three or more, heap dumps. For example, the determination 410 can be done using the method described in the related application entitled "Memory Leak Detection" cited above and incorporated herein by reference. If a statistical analysis of the class histograms reveals a growing trend of the heap size, more heap dumps can be collected to enable search for statistically significant growth roots.

The results of the analysis 410 can be the set of growing classes (G). Further, the series of heap dumps can be analyzed using the condition above, to find roots of growth $R_i$ and statistically significant roots of growth (trend of the link count from the roots follows the trend of the total heap size). Details of an exemplary process for such statistical analysis will be described below.

The heap instances can be traversed 415 based on the referrer instance of one or more objects identified as contributing to the growth of the heap to a root object identified as not contributing to the growth of the heap. The result of the heap traversal 415 is a series of sets of reference subsets for a series of heap instances. The trends of the reference subset sizes are statistically analyzed 420 in the next step. For example, part of the statistical analysis 420 as will be described below can comprise calculating a correlation coefficient indicating a relevance of a group of references to growth of the heap. According to one embodiment, the correlation coefficient can have a value between −1.0 and +1.0. In such cases, identifying at least one reference subset contributing to the growth of the memory heap can comprise identifying a subset having a correlation coefficient of approximately +1.0 and referenced by a subset of root objects being the referrers of those references.

The above algorithm provides for finding roots from which instances of the classes considered growing are reachable. It is possible to perform statistical analysis of a series of sets of references to determine the growth roots from which the number of referenced instances can be seen increasing. It is also possible to apply simpler methods, if analysing only two heaps, but such analysis would be representative of only two points in the program's life. To do that, for each set of growth roots $R_i$ of heap $H_i$, group the roots into k subsets $Z_{ki}$ such that they contain references whose S, F, T match the classes of the corresponding values of any other reference in the set. This can be expressed formally as:

$$\forall i,j \langle S,F,T \rangle \in Z_{ki}, \langle S',F',T' \rangle \in Z_{kj}, F=F',$$

and the classes of S and S', and T and T' match. The size of $Z_{ki}$ is the number of references of one type found in heap $H_i$ (and $Z_{kj}$ is the set of references of the same type in heap $H_j$). The correlation coefficients $X_k$ can be computed between a set of sizes of each set of similar references $Z_{ki}$ and a set of memory heap sizes $H_i$. According to one embodiment, the set of references whose correlation coefficient $X_k$ is close to +1.0 can be considered to reference the growth that follows the trend of the memory heap very well, and the growth can be considered rooted at the set of referrers from the tuples in the corresponding $Z_{ki}$. It is often sufficient to get a single tuple from any $Z_{ki}$ for each k to determine the code paths causing the growth.

A process for performing reference grouping for one instance of heap data according to one embodiment of the present invention can comprise, for example, performing depth-first search for paths in a set of tuples, extracted from the instance of heap data, recording the number of growing objects reachable from each type of reference, and marking the objects that have been visited to make the traversal process more efficient. At first, a set of SFT tuples can be selected with the same S. In other words, all references from a single object are identified. This is easy to do, as the heap dumps are usually organized in such a way that all such tuples are grouped in a vector, as explained before. If object S can be determined as already visited, choose a new set of tuples, or terminate, if no more unvisited objects are available. Object S can be marked as visited. A determination can be made if S belongs to a class identified as contributing to the growth. If so, then a new set of SFT tuples can be selected. For every SFT tuple a determination can be made if T belongs to a class identified as an array or a collection, or a contributor to the growth. If S is neither an array, nor a collection, it is a growth root candidate, and if T is a contributor to the growth, increment a counter corresponding to the number of SFT tuples, i.e., the size of the corresponding reference set. If T is an array or a collection, select all S'F'T' tuples with S' corresponding to T, and recursively execute this same algorithm. The recursion will be finite, because there is a finite number of objects in the heap, and the objects are visited no more than once.

Upon a return from the recursive call, the object T can be marked as visited and will record the number of objects identified as contributing to the growth reachable directly or through a chain of arrays or collection objects. If S is an array, or a collection, add the number of objects contributing to the growth, reachable from T to the number of such objects reachable from S. Otherwise, it is a growth root candidate, so add this count to the reference set size corresponding to the matching SFT reference set. After iterating through all SFT tuples for this object, the set sizes for all corresponding SFT set sizes has been updated with the number of objects contributing to the growth reachable directly, or through a chain of arrays and collections, if it is a growth root candidate, or the number of such objects recorded as reachable from S directly or through a chain of arrays or collections, if S is an array or a collection.

In a pseudo-language this can be defined as:

```
analyseHeap(Heap h){
  initializeSetSizes; // initializes a map of reference type to
  reference set size
  for each Object s in h do{
    visitObject(s);
  }
  return a map of set sizes, with the reference type SFT as the
  key, and the set size as the value; this map is updated by
  updateSetSize called from visitObject
}
visitObject(Object s){
  if ( isVisited( s ) ) return;
  markVisited(s);
  if ( isGrower( s ) ) return;
  reachable = 0;
  for each Reference sft in s do{
    immediatelyReachable = 0;
    if ( isArrayOrCollection( sft.T ) ) { // check the T part of
    the tuple
      visitObject( sft.T );
      immediatelyReachable = sft.T.reachableCount;
    }
    else if ( isGrower( sft.T ) ) {
      markVisited( sft.T );
      immediatelyReachable = 1;
    }
    if ( not isGrower( s ) and not isArrayOrCollection( s ) ) {
      updateSetSize( sft, immediatelyReachable ); // update a global
      counter of growers referenceable through references like sft
    }
    reachable = reachable + immediatelyReachable;
  }
  if ( isArrayOrCollection( s ) ) {
    s.reachableCount = reachable; // update a globally visible
    property of this object, which can be used by the caller to
    determine the number of growers referenceable through a chain
    of collections or arrays
  }
}
```

In other words, the reference sets $Z_k$, can be analyzed to identify the set of growers, G. This illustrates how to group references into sets in each individual heap dump. As noted above, a correlation coefficient can be calculated for each subset based on the size of each subset relative to the total heap size. An exemplary process for calculating such a correlation coefficient is described below with reference to FIG. 5 which illustrates how to compute correlation coefficients between cardinalities of $Z_{ki}$ and heap size for each heap instance $H_i$. Generally speaking, correlation coefficient indicates a relevance of a group of references to growth of the heap. According to one embodiment, the correlation coefficient can have a value between −1.0 and +1.0. In such cases, identifying at least one subset contributing to the growth of the memory heap can comprise identifying a subset having a correlation coefficient of approximately +1.0 and referenced by a subset of root objects, which are referrers in these sets of references.

Figure 5:
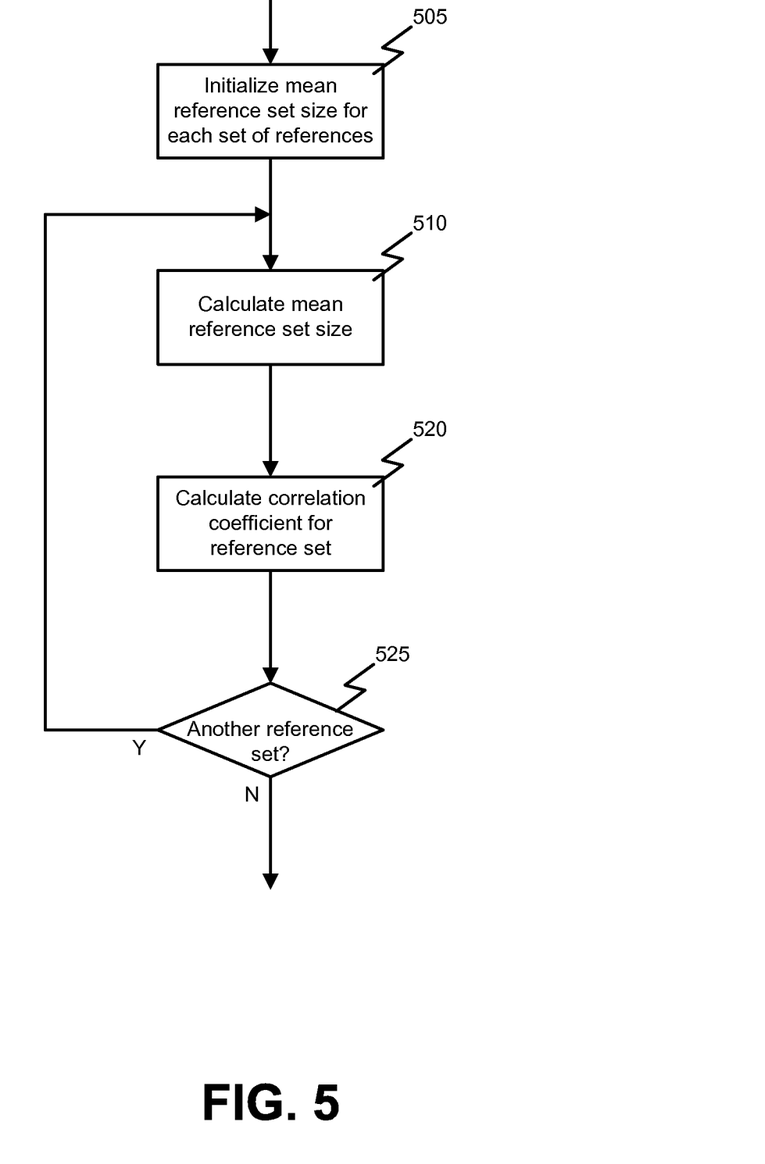
FIG. 5 is a flowchart illustrating a process for calculation of a correlation coefficient according to one embodiment of the present invention.

FIG. 5 is a flowchart illustrating a process for calculation of a correlation coefficient according to one embodiment of the present invention. In this example, the process can begin with initializing 505 mean reference set size for each set of references $Z_k$. The mean reference set size (the cardinality of $Z_{ki}$ in each heap instance $H_i$) can be calculated 510. The correlation coefficient can be calculated 520 for the reference set based on the mean reference set size, the count of heap instances and a total size of each heap instance. A determination 525 can be made as to whether additional heap instances are available. If 525 additional heap instances are available, processing can be repeated to calculate 510 the mean instance sizes for all sets of references, and calculate 520 the correlation coefficient for each reference set represented in the heap.

Thus, the methods and systems described herein provide for sorting the references to growing objects by the similarity of their trend to the trend of the total memory consumption. If the memory consumption of the software program is growing, the closest trends can be those of the references that appear to be referencing leaking objects, and the trends of the references to objects whose memory footprint stabilizes, can be dissimilar to the trend of the total memory consumption, when the memory leak is present. This allows for focusing the investigation on the references whose trend is very similar to that of the total memory consumption, but whose referrer instance counts are very low, because this means investigation of code paths creating new references from the growth root to the growth.

Embodiments described here provide for analysis of memory leak problems as they occur. That is, it is not necessary to wait for the program to reach a point close to the failure to allocate any more memory. It is possible to implement embodiments described herein as a standalone analyzer software, or embed it into a program or apparatus as part of its self-diagnostic mechanism.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for analyzing heap data, the method comprising:
    obtaining the heap data from a memory, the heap data representing a plurality of objects of one or more classes, each object identifying a referrer instance, a field in the referrer, and a referent instance;
    performing a statistical analysis on the plurality of heap data to identify references to objects within the heap that are contributing to a growth of the heap, wherein performing the statistical analysis on the heap data comprises grouping the plurality of references into a plurality of subgroups based on the identified referrer instance, field in the referrer, and referent instance of each object, determining a size of each subset, determining a size of each subset relative to a total heap size, identifying at least one subset of references contributing to the growth of the heap based on the size of each subset relative to the total heap size, and calculating a correlation coefficient for each subset based on the size of each subset relative to the total heap size; and
    traversing the heap based on the referrer instance of one or more objects identified as contributing to the growth of the heap to a root object identified as not contributing to the growth of the heap.

2. The method of claim 1, wherein obtaining the heap data comprises collecting class histograms for the class of each of the plurality of objects.

3. The method of claim 2, wherein the class histograms comprise a list of names of the classes of the plurality of objects, counts of objects of each class, cumulative memory size used by each of the objects, and total memory used.

4. The method of claim 1, wherein the correlation coefficient of each subset has a value between −1.0 and +1.0.

5. The method of claim 4, wherein identifying at least one subset contributing to the growth of the memory heap comprises identifying a subset having a correlation coefficient of approximately +1.0.

6. The method of claim 1, wherein obtaining the heap data comprises collecting three or more heap dumps dynamically during execution of an application creating the instances.

7. A system comprising:
    a processor; and
    a memory communicatively coupled with and readable by the processor and having stored therein a series of instructions which, when executed by the processor, cause the processor to analyze heap data by obtaining the heap data from a memory, the heap data representing a plurality of objects of one or more classes, each object identifying a referrer instance, a field in the referrer, and a referent instance, performing a statistical analysis on the heap data to identify references to objects within the heap that are contributing to a growth of the heap, wherein performing the statistical analysis on the heap data comprises grouping the plurality of references into a plurality of subgroups based on the identified referrer instance, field in the referrer, and referent instance of each object, determining a size of each subset, determining a size of each subset relative to a total heap size, identifying at least one subset of references contributing to the growth of the heap based on the size of each subset relative to the total heap size, and calculating a correlation coefficient for each subset based on the size of each subset relative to the total heap size, and traversing the heap based on the referrer instance of one or more objects identified as contributing to the growth of the heap to a root object identified as not contributing to the growth of the heap.

8. The system of claim 7, wherein obtaining the heap data comprises collecting class histograms for the class of each of the plurality of objects.

9. The system of claim 8, wherein the class histograms comprise a list of names of the classes of the plurality of objects, counts of objects of each class, cumulative memory size used by each of the objects, and total memory used.

10. The system of claim 8, wherein the correlation coefficient of each subset has a value between −1.0 and +1.0.

11. The system of claim 10, wherein identifying at least one subset contributing to the growth of the memory heap comprises identifying a subset having a correlation coefficient of approximately +1.0.

12. The system of claim 8, wherein obtaining the heap data comprises collecting three or more heap dumps dynamically during execution of an application creating the instances.

* * * * *

UNITED STATES PATENT AND TRADEMARK OFFICE
CERTIFICATE OF CORRECTION

PATENT NO. : 8,504,878 B2  
APPLICATION NO. : 12/773203  
DATED : August 6, 2013  
INVENTOR(S) : Otenko Page 1 of 1

It is certified that error appears in the above-identified patent and that said Letters Patent is hereby corrected as shown below:

In the Specification

In column 9, line 29-30, delete "$f(S,T)=S \notin G_\wedge (T \in G_\wedge (T \in C_\wedge \exists <T,F',T'>\in H_i \vee f(T,T'))),$" and insert -- $f(S,T)=S \notin G_\wedge (T \in G_\vee (T \in C_\wedge \exists <T,F',T'>\in H_i \wedge f(T,T'))),$ --, therefor.

In column 11, line 40, delete "$\forall i,j <S,F,T> \in Z_{ki}, <S',F',T'> \in Z_{kj}, F=F',$" and insert -- $\forall i,j <S,F,T> \in Z_{ki}, <S',F',T'> \in Z_{kj}, F=F',$ --, therefor.

In the Claims

In column 15, line 18, in Claim 10, delete "claim 8," and insert -- claim 7, --, therefor.

In column 15, line 24, in Claim 12, delete "claim 8," and insert -- claim 7, --, therefor.

Signed and Sealed this  
Nineteenth Day of November, 2013

Teresa Stanek Rea  
*Deputy Director of the United States Patent and Trademark Office*